(12) United States Patent
Pettit

(10) Patent No.: US 12,445,277 B2
(45) Date of Patent: Oct. 14, 2025

(54) THRESHOLD KEY EXCHANGE

(71) Applicant: nChain Licensing AG, Zug (CH)

(72) Inventor: Michaella Pettit, London (GB)

(73) Assignee: nChain Licensing AG, Zug (CH)

( * ) Notice: Subject to any disclaimer, the term of this patent is extended or adjusted under 35 U.S.C. 154(b) by 155 days.

(21) Appl. No.: 18/275,372

(22) PCT Filed: Jan. 5, 2022

(86) PCT No.: PCT/EP2022/050116
§ 371 (c)(1),
(2) Date: Aug. 1, 2023

(87) PCT Pub. No.: WO2022/167163
PCT Pub. Date: Aug. 11, 2022

(65) Prior Publication Data
US 2024/0097894 A1 Mar. 21, 2024

(30) Foreign Application Priority Data
Feb. 5, 2021 (GB) ........................ 2101590

(51) Int. Cl.
*H04L 9/08* (2006.01)
(52) U.S. Cl.
CPC .......... *H04L 9/0861* (2013.01); *H04L 9/0825* (2013.01); *H04L 9/085* (2013.01)
(58) Field of Classification Search
CPC ...... H04L 9/0861; H04L 9/0825; H04L 9/085
See application file for complete search history.

(56) References Cited

U.S. PATENT DOCUMENTS

| 7,246,232 B2 * | 7/2007 | Dutertre ............. H04W 12/041 713/151 |
| 8,144,874 B2 | 3/2012 | McGough |
| 9,813,244 B1 | 11/2017 | Triandopoulos et al. |
| 9,894,151 B2 | 2/2018 | Dhuse et al. |
| 10,211,981 B2 | 2/2019 | Camenisch et al. |
| 10,511,436 B1 | 12/2019 | Machani |
| 10,764,043 B2 | 9/2020 | Traynor et al. |

(Continued)

FOREIGN PATENT DOCUMENTS

| JP | 2007124032 A | 5/2007 |
| JP | 2008199278 A | 8/2008 |

(Continued)

OTHER PUBLICATIONS

Combined Search and Examination Report under Sections 17 and 18(3) for Application No. GB2111440.0 mailed on Jan. 25, 2022, 6 pages.

(Continued)

*Primary Examiner* — Bassam A Noaman
(74) *Attorney, Agent, or Firm* — Messner Reeves LLP

(57) ABSTRACT

A computer-implemented method of generating a shared cryptographic key based on at least one shared secret, wherein each participant belonging to a first group has a respective share of a first secret, the first secret having a first threshold and a corresponding first public key, wherein a second coordinator has a second public key corresponding to a second secret, wherein the second coordinator is configured to generate the same shared cryptographic key.

19 Claims, 4 Drawing Sheets

(56) References Cited

U.S. PATENT DOCUMENTS

| | | | |
|---|---|---|---|
| 10,903,991 | B1 | 1/2021 | Craige et al. |
| 11,323,267 | B1* | 5/2022 | Griffin .................... H04L 9/085 |
| 11,563,567 | B2* | 1/2023 | Le Saint ............... H04L 9/0897 |
| 11,973,867 | B2 | 4/2024 | Tysor et al. |
| 2002/0116611 | A1 | 8/2002 | Zhou et al. |
| 2003/0009694 | A1 | 1/2003 | Wenocur et al. |
| 2003/0059041 | A1 | 3/2003 | Mackenzie et al. |
| 2010/0037055 | A1 | 2/2010 | Fazio et al. |
| 2011/0138192 | A1 | 6/2011 | Kocher et al. |
| 2014/0164769 | A1* | 6/2014 | D'Souza ............. H04L 63/0823 |
| | | | 713/168 |
| 2014/0325309 | A1 | 10/2014 | Resch |
| 2015/0100781 | A1 | 4/2015 | Yann et al. |
| 2015/0288525 | A1 | 10/2015 | Camenisch et al. |
| 2017/0223008 | A1 | 8/2017 | Camenisch et al. |
| 2017/0250972 | A1 | 8/2017 | Ronda et al. |
| 2018/0060248 | A1* | 3/2018 | Liu ........................ H04L 67/568 |
| 2018/0074889 | A1 | 3/2018 | Resch et al. |
| 2018/0101697 | A1* | 4/2018 | Rane ....................... H04L 9/085 |
| 2018/0183601 | A1 | 6/2018 | Campgana |
| 2018/0212772 | A1 | 7/2018 | Leavy et al. |
| 2018/0307573 | A1 | 10/2018 | Abraham et al. |
| 2018/0349867 | A1* | 12/2018 | Trieflinger .......... G06Q 20/065 |
| 2019/0007205 | A1* | 1/2019 | Corduan ............... H04L 9/0825 |
| 2019/0280864 | A1 | 9/2019 | Cheng et al. |
| 2019/0370792 | A1 | 12/2019 | Lam |
| 2019/0372759 | A1 | 12/2019 | Rix |
| 2020/0044863 | A1* | 2/2020 | Yadlin ....................... G06F 9/54 |
| 2020/0074450 | A1 | 3/2020 | Fletcher et al. |
| 2020/0145231 | A1 | 5/2020 | Trevethan |
| 2020/0153640 | A1 | 5/2020 | Ranellucci |
| 2020/0169391 | A1 | 5/2020 | Kapp et al. |
| 2020/0213099 | A1 | 7/2020 | Wright |
| 2020/0213113 | A1 | 7/2020 | Savanah et al. |
| 2020/0259638 | A1 | 8/2020 | Carmignani et al. |
| 2020/0259651 | A1 | 8/2020 | Mohassel et al. |
| 2020/0311678 | A1 | 10/2020 | Fletcher et al. |
| 2020/0353167 | A1 | 11/2020 | Vivek et al. |
| 2021/0049600 | A1 | 2/2021 | Spector |
| 2021/0089676 | A1 | 3/2021 | Ford et al. |
| 2021/0359843 | A1 | 11/2021 | Li et al. |
| 2021/0377049 | A1 | 12/2021 | Nix |
| 2022/0172180 | A1* | 6/2022 | Komiyama ............. G06F 21/64 |
| 2022/0182235 | A1 | 6/2022 | Tysor et al. |
| 2022/0239509 | A1 | 7/2022 | Jang et al. |
| 2022/0286276 | A1 | 9/2022 | Li et al. |
| 2022/0311623 | A1 | 9/2022 | Tomlinson |
| 2022/0321340 | A1 | 10/2022 | Tsitrin |
| 2023/0361993 | A1 | 11/2023 | Camenisch et al. |

FOREIGN PATENT DOCUMENTS

| | | |
|---|---|---|
| JP | 2013513312 A | 4/2013 |
| JP | 2015194959 A | 11/2015 |
| JP | 2018005089 A | 1/2018 |
| WO | 9937052 A1 | 7/1999 |
| WO | 2015160839 | 10/2015 |
| WO | 2017145010 A1 | 8/2017 |
| WO | 2018189656 A1 | 10/2018 |
| WO | 2019034951 A1 | 2/2019 |
| WO | 2019034986 A1 | 2/2019 |
| WO | 2019158209 | 8/2019 |
| WO | 2019193452 A1 | 10/2019 |
| WO | 2019246206 | 12/2019 |
| WO | 2020084418 A1 | 4/2020 |
| WO | 2021213959 A1 | 10/2021 |
| WO | 2021254702 A1 | 12/2021 |
| WO | 2023072502 A1 | 5/2023 |

OTHER PUBLICATIONS

Combined Search and Examination Report under Sections 17 and 18(3) for Application No. GB2111441.8 mailed on Jan. 25, 2022, 6 pages.

Combined Search Report under Sections 17 for Application No. GB2111442.6 mailed on Jan. 25, 2022, 4 pages.

Dikshit P., et al., "Efficient Weighted Threshold ECDSA for Securing Bitcoin Wallet," 2017 ISEA Asia Security and Privacy (ISEASP), IEEE, Jan. 29, 2017, pp. 1-9, DOI: 10.1109/ISEASP.2017.7976994.

Ewa Syta et al: "Keeping Authorities "Honest or Bust" with Decentralized Witness Cosigning", 2016 IEEE Symposium On Security and Privacy (SP), May 1, 2016 (May 1, 2016), pp. 526-545.

Gennaro R., et al., "Fast Multiparty Threshold ECDSA with Fast Trustless Setup," Proceedings of the 2018 ACM SIGSAC Conference on Computerand Communications Security, Oct. 2018, pp. 1179-1194.

Gennaro R., et al., "Robust Threshold DSS Signatures," International Conference on the Theory and Applications of Cryptographic Techniques, 1996, EUROCRYPT '96 pp. 354-371.

International Search Report and Written Opinion for Application No. PCT/EP2022/069246 mailed on Nov. 3, 2022, 15 pages.

International Search Report and Written Opinion for International Application No. PCT/EP2022/076636, mailed Jan. 20, 2023, 12 pages.

Wuille P., "BIP 32: Hierarchical Deterministic Wallets," Github Bitcoin BIPs, Feb. 2012, 6 pages, Retrieved from the Internet: URL: https://en.bitcoin.it/wiki/BIP_0032, Retrieved on Aug. 24, 2020.

PCT/EP2022/050116 International Search Report and Written Opinion dated Apr. 26, 2022, 14 pages.

Joonsang Baek et al: "Simple and efficient threshold cryptosystem from the gap diffie-hellman group", GLOBECOM '03. 2003-IEEE Global Telecommunications Conference. Conference Proceedings. San Francisco, CA, Dec. 1-5, 2003; [IEEE Global Telecommunications Conference] New York, NY, vol. 3, Dec. 1, 2003 (Dec. 1, 2003), pp. 1491-1495.

Denis Kolegov et al: "Towards Threshold Key Exchange Protocols", Arxiv.Org, Cornell University Library, 201 Olin Library Cornell University Ithaca, NY 14853, Dec. 27, 2020 (Dec. 27, 2020), XP081849900, section 2.2.

Cachin Christian, "Security and Fault-tolerance in Distributed Systems—Distributed Cryptography", Dec. 31, 2012 (Dec. 31, 2012), XP055903112, Retrieved from the Internet: URL: https://cachin.com/cc/sft12/distcrypto.pdf, sections 7.2, 7.3, 7.4.

GB2101590.4 Combined Search and Examination Report dated Jul. 30, 2021, 7 pages.

Combined Search and Examination Report for Application No. GB2009062.7, mailed on Mar. 12, 2021, 10 pages.

Combined Search and Examination Report under Sections 17 and 18(3) for Application No. GB2011686.9, mailed on Apr. 22, 2021, 10 pages.

Combined Search and Examination Report under Sections 17 and 18(3) for Application No. GB2017103.9 mailed on Jun. 28, 2021, 13 pages.

Fornaro D., "Elliptic Curve Hierarchical Deterministic Private Key Sequences: Bitcoin Standards and BestPractices," Master Thesis, Apr. 19, 2018, retrieved from the URL: https://www.politesi.polimi.it/bitstream/10589/140112/1/2018_04_Fornaro.pdf, 53 pages.

Gennaro R., et al., "Robust Threshold DSS Signatures," International Conference on the Theory and Applications of Cryptographic Techniques, 2001, vol. 164, pp. 54-84.

Goldfeder S., et al., "Securing Bitcoin Wallets via Threshold Signatures," 2014, retrieved from the URL: https://www.cs.princeton.edu/stevenag/bitcoin_threshold_signatures.pdf, sections "Threshold ECDSA Signature Generation" and "Threshold Deterministic Address Derivation", 11 pages.

International Search Report and Written Opinion for Application No. PCT/EP2021/062941, mailed on Aug. 3, 2021, 14 pages.

International Search Report and Written Opinion for Application No. PCT/EP2021/076686 mailed on Feb. 14, 2022, 17 pages.

International Search Report and Written Opinion issued in International Application No. PCT/EP2021/067673, mailed on Sep. 28, 2021, 13 pages.

Luzio A.D., et al., "Arcula: A Secure Hierarchical Deterministic Wallet for Multi-asset Blockchains," Section 2, Dec. 10, 2019, 33 pages.

Pramanik S., et al., "VPSS: A Verifiable Proactive Secret Sharing Scheme in Distributed Systems," IEEE Military Communications

(56) References Cited

OTHER PUBLICATIONS

Conference, Milcom, Oct. 13, 2003, vol. 2, pp. 826-831, XP010698401, DOI: 10.1109/MILCOM.2003.1290219, ISBN: 978-0-7803-8140-7.

Combined Search and Examination Report under Sections 17 and 18(3) for Application No. GB2105992.8 mailed on Jan. 17, 2022, 9 pages.

Damgard I., et al., "Fast Threshold ECDSA with Honest Majority", Aug. 23, 2020, Computer Vision—ECCV2020: 16th European Conference, Proceedings; Part of the Lecture Notes in Computer Science, 35 pages.

International Search Report and Written Opinion for Application No. PCT/EP2022/058085 mailed on Jul. 26, 2022, 14 pages.

Pettit M. "Shared Secrets and Threshold Signatures," May 1, 2020, [retrieved on Jun. 14, 2021], pp. 1-23, Retrieved from the Internet: URL: https://nakasendoproject.org/Threshold-Signatures-whitepaper-nchain.pdf, sections 4 and 5; p. 22.

Hideyuki F., et al., "Updating Method of Distributed Data in Secret Sharing System," Research Report of Computer Security (CSEC), Japan, Information Processing Society of Japan, May 15, 2014, vol. 2014—CSEC-65, No. 1, pp. 1-6, 10 pages.

Shingu T., et al., "Updating Method of Verifiable Distributed Data in the Secret Sharing Scheme," Japan, Information Processing Society of Japan, Nov. 28, 2014, vol. 2014—CSEC-67, No. 5, pp. 1-6, 9 pages.

Boldyreva A., et al., "Threshold Signatures, Multisignatures and Blind Signatures Based on the Gap-diffie-hellman- group Signature Scheme," International Workshop on Public Key Cryptography, Berlin, Heidelberg: Springer Berlin Heidelberg, 2003, 16 pages.

Camenisch J., et al., "Short Threshold Dynamic Group Signatures," International conference on security and cryptography for networks Cham: Springer International Publishing, 2020, pp. 401-423.

\* cited by examiner

THRESHOLD KEY EXCHANGE

CROSS REFERENCE TO RELATED APPLICATIONS

This application is the U.S. National Stage of International Application No. PCT/EP2022/050116 filed on Jan. 5, 2022, which claims the benefit of United Kingdom Patent Application No. 2101590.4, filed on Feb. 5, 2021, the contents of which are incorporated herein by reference in their entireties.

TECHNICAL FIELD

The present disclosure relates to a method of generating shared cryptographic keys.

BACKGROUND

Public-key cryptography is a type of cryptographic system that uses pairs of keys: private keys which are known only to the owner of the private key, and public keys which are generated based on the corresponding private key and which may be disseminated without compromising the security of the private key.

Public-key cryptography enables a sender to encrypt a message using a recipient's public key (i.e. the public key corresponding to a private key known only to the recipient). The encrypted message can then only be decrypted using the recipient's private key. This type of encryption is known as asymmetric encryption.

An alternative to asymmetric encryption is symmetric encryption. Here, only one key (a secret key) is used to both encrypt and decrypt a message (any data). The entities communicating via symmetric encryption must exchange the key so that it can be used in the decryption process.

Returning to public-key cryptography, a sender can use their own private key to sign a message, e.g. to prove that the message is being sent by the sender, and/or to indicate that the sender agrees with the message. The signer (i.e. the party generating the signature) uses their private key to create a digital signature on the message. Anyone with the signer's corresponding public key can use the same message and the digital signature on the message to verify whether the signature was validly created, i.e. whether the signature was indeed made using the signer's private key.

A digital signature scheme typically involves three procedures, i.e. algorithms. A key generation algorithm is used to generate a random private key and a corresponding public key. A signing algorithm is used to generate a signature based on a message and the private key. A verification algorithm is used to verify, given a public key and the message, whether the signature has been generated using the corresponding private key and according to the signing algorithm.

Threshold cryptography refers to a cryptographic system that distributes shares (sometimes called slices) of a private key between a plurality of participants. A threshold (i.e. minimum) number of those shares are required in order to re-create the private key. Depending on the particular system that is used, the private key may first be generated and then split into shares, or the shares of the private key may be generated without the private key ever existing. A message may be encrypted with the corresponding public key. A threshold number of participants must cooperate in order to decrypt the message.

A threshold signature scheme allows a threshold number of participants in a group to create a digital signature on (i.e. of) a message using individual shares of a shared private key. Here, a digital signature is a signature which is generated based on the message to be signed. In such a scheme, the signature can only be created if the threshold number of participants agree to generate the signature on the message. Any attempt to generate a signature using a smaller number of participants will not generate a valid signature. Therefore, a valid signature by the group (i.e. one generated using the message and the shared private key) provably had the threshold number of people agree to generate the signature. This also implies that any adversary needs to obtain the threshold number of shares of the private key to forge a signature with that private key. A common feature of threshold signature shares is that if any of the private key shares are lost, the private key can still be recoverable provided that the threshold number of shares are still available.

Diffie-Hellman key exchange refers to a protocol for generating a shared cryptographic key. The protocol can be summarised as follows. A first party and a second party each have a respective private-public key pair. The public keys are known to each party. The first party can calculate the shared key based on the elliptic curve multiplication of the first party's private key and the second party's public key. The second party can calculate the same shared key based on the elliptic curve multiplication of the second party's private key and the first party's public key. This allows both parties to calculate the same shared key without divulging private information. Only the two parties can calculate the shared key because only they know their respective private keys.

SUMMARY

A problem with the existing Diffie-Hellman (DH) key exchange method is that it introduces a single point of failure. That is, if the private key of one of the parties is compromised by an attacker (or even accidentally disclosed) then the shared key can be obtained (assuming the other party's public key is known, which is often the case). Therefore any message that has been encrypted with the shared key can be decrypted by the attacker. This is particularly problematic if the message contains sensitive data such as, for example, personal identifying information, financial data, medical data, etc.

It would therefore be desirable to increase the security of the DH key exchange method, or other similar methods that involve the generation of keys based on a secret (e.g. a private key).

According to one aspect disclosed herein, there is a computer-implemented method of generating a shared cryptographic key based on at least one shared secret, wherein each participant belonging to a first group has a respective share of a first secret, the first secret having a first threshold and a corresponding first public key, wherein a second coordinator has a second public key corresponding to a second secret, and wherein the method is performed by a first coordinator of the first group and comprises: obtaining, from at least the first threshold number of participants of the first group, respective shares of the shared cryptographic key, where each respective share of the shared cryptographic key is based on i) a respective share of the first secret or a respective zeroth order coefficient of a respective private polynomial used to calculate the respective share of the first secret, and ii) the second public key; and generating the shared cryptographic key based on the obtained respective shares of the cryptographic key, wherein the second coordinator is configured to generate the same shared cryptographic key.

Embodiments of the present invention increase the security of shared keys (shared in the sense that the shared key is known to two different parties). Instead of generating a shared key based on a complete secret (e.g. a private key), the shared key is instead generated based on a shared secret (e.g. a shared private key). The shared secret is shared in the sense that each participant of a group has a share of a shared secret (e.g. a share of a shared private key). This shared secret is not known to two different parties. Moreover, the shared secret may not exist as a whole secret (e.g. key) in the sense that no individual knows that key. The shared secret will be referred to below as a shared Diffie-Hellman (DH) key to more easily distinguish it from the group's shared secret. However it should be appreciated that this is merely used as convenient label. The shared secret may also be referred to as a common secret, i.e. a secret common to (known to) more than one party. The private key shares may have been generated such that the private key never existed. The skilled person will be familiar with such techniques. Therefore no single party has access to the shared secret. The shared secret has a threshold, meaning that at least a threshold number of shares of the shared secret are required to reconstruct the shared secret.

The present invention generates the shared DH key based on one party's (or entity's) public key and at least a threshold number of shares of the shared secret. The complete shared DH key can only be constructed if enough different shares of the shared DH key are made available. Now, given that the shared secret does not exist (i.e. it is not stored by any one participant), it cannot be compromised, making it more difficult for an attacker to obtain the shared DH key. Moreover, in the event that an attacker compromises a participant's share of the shared secret, that share does not give enough information away in order to reconstruct the shared secret nor the shared DH key. An attacker would have to compromise the threshold number of shares, which is much more difficult task than compromising a single private key.

To further improve security of the shared DH key, both parties may use shared secrets. That is, one group of participants may have shares of a first shared secret and another group of participants may have shares of a second shared secret. Each group generates respective shares of the shared DH key using the other group's public key and shares of their own group's shared secret.

In some embodiments, each and every participant of a group may be required to calculate a share of the shared DH key in order for that group to construct the shared DH key. This is particularly useful for use cases whereby collaboration of all participants is required.

BRIEF DESCRIPTION OF THE DRAWINGS

To assist understanding of embodiments of the present disclosure and to show how such embodiments may be put into effect, reference is made, by way of example only, to the accompanying drawings in which.

DETAILED DESCRIPTION OF EMBODIMENTS

Figure 1:
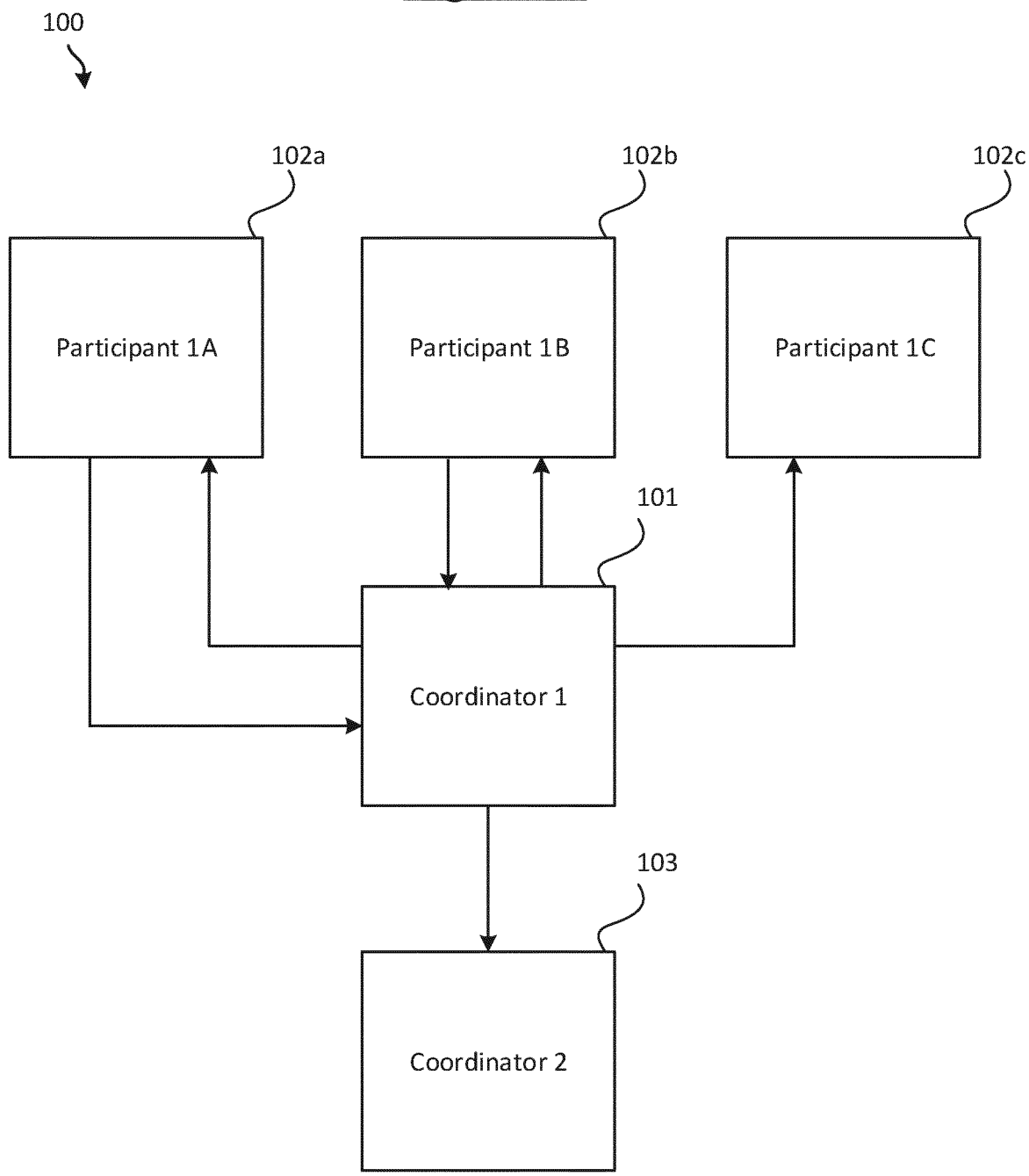
FIG. 1 schematically illustrates an example system for generating shared keys according to some embodiments of the present invention, FIG. 2 schematically illustrates another example system for generating shared keys according to some embodiments of the present invention.

Cryptographic Preliminaries
Elliptic Curve Groups
An elliptic curve E satisfies the equation:

$$y^2 = x^3 + ax + b \mod p$$

where $a, b \in \mathbb{Z}_p$ and a, b are constants satisfying $4a^3 + 27b^2 \neq 0$. The group over this elliptic curve is defined to be the set of elements (x, y) satisfying this equation along with the point at infinity $\mathcal{O}$, which is the identity element. The group operation on the elements in this group is called elliptic curve point addition and denoted by +. This group is denoted by $E(\mathbb{Z}p)$ and its order by n.

This group operation can be used to define another operation on the elements called point multiplication denoted by ·. For a point $G \in E(\mathbb{Z}_p)$ and a scalar $k \in \mathbb{Z}_n^*$, the point k·G is defined to be the point G added to itself k times.

In elliptic curve cryptography, a private key is defined to be a scalar $k \in \mathbb{Z}_n \setminus \{0\}$ where $\mathbb{Z}_n \setminus \{0\}$ is notation for the set $\{1, \ldots, n-1\}$, and the corresponding public key is the point k·G on an elliptic curve. For instance, in some blockchain protocols, the elliptic curve is chosen to be the secp256k1 elliptic curve, and the values a, b, and p are completely specified by this curve. The order n of this group has been calculated given these values, which in the case of this curve is a prime, and the secp256k1 standard also specifies a point G which is to be used as the generator of this group.

Elliptic Curve Digital Signature Algorithm
In order to create a signature on a message msg, with the private key a, the following steps are taken:
1. Calculate the message digest e=hash(msg), where may be any hash function. For instance, in some examples hash(msg)=SHA256(SHA256(msg)) where SHA256 (■) is the SHA-256 hash function. Note that instead the message may be hashed only once, or more that two times with the same or different hash functions.
2. Chose a random integer $k \in \{1, \ldots, n-1\}$, where n is the order of the elliptic curve, e.g. the secp256k1 curve. In the following, k is referred to as the ephemeral private key.
3. Calculate the ephemeral public key corresponding to this ephemeral private key k·G=$(R_x, R_y)$.
4. Calculate $r = R_x \mod n$. If r=0, return to step 2.
5. Calculate the multiplicative inverse of the ephemeral key $k^{-1} \mod n$.
6. Calculate $s = k^{-1}(e + ar) \mod n$. If s=0, return to step 2.
7. The signature on the message msg is (r,s).

The ephemeral key must be kept secret, otherwise the private key can be calculated, given a message and signature. Additionally, each time a signature is generated, a different ephemeral key must be used. If this is not the case, it is possible to derive the private key a given two different signatures and their corresponding messages.

Given a message msg, a public key P=a·G, and corresponding signature (r,s), then one can verify the signature by completing the following steps:
1. Calculate the message digest e=hash(msg), e.g. e=SHA256(SHA256(msg)).
2. Calculate the multiplicative inverse $s^{-1}$ of s modulo n.
3. Calculate $j_1 = es^{-1} \mod n$ and $j_2 = rs^{-1} \mod n$.

4. Calculate the point $Q=j_1 \cdot G+j_2 \cdot P$.
5. If $Q=\mathcal{O}$, the point at infinity, the signature is invalid.
6. If $Q \neq \mathcal{O}$, then let $Q:=(Q_x, Q_y)$, and calculate $u=Q_x \mod n$. If $u=r$, the signature is valid.

In threshold signature schemes, this private key a is split into key shares that are distributed amongst participants in a threshold scheme group.

Joint Verifiable Random Secret Sharing

Assume that N participants want to create a joint secret that can only be regenerated by at least (t+1) of the participants in the scheme. To create the shared secret, the following steps are taken:

1. The participants agree on the unique label i for each participant. Each participant i generates (t+1) random numbers $$a_{ij} \in_R \mathbb{Z}_n \backslash \{0\}, \forall j=0, \ldots, t,$$

where $\in_R$ means a randomly generated element of the set $\mathbb{Z}_n \backslash \{0\}$ where $\mathbb{Z}_n \backslash \{0\}$ is notation for the set $\{1, \ldots, n-1\}$. Then each participant has a secret polynomial of order t $$f_i(x) = a_{i0} + a_{i1}x + \ldots + a_{it}x^t \mod n,$$

for $i=1, \ldots, N$. Note that we omit the mod n notation from now on, and it is assumed that all arithmetic operations over integers are done modulo n.

2. Each participant i sends the value $f_i(j)$ to participant j e.g. using a secure communication channel with participant j only.
3. Each participant i calculates their own private secret share of a shared secret polynomial as $$a_i := \sum_{j=1}^{N} f_j(i).$$

A shared secret share is a point with the form $(i, a_i)$, where i is the participants label in the scheme. This method for creating a secret share of a, as described in steps 1-3, is denoted herein by $a_i$=JVRSS(i) for participant i. Note that "JVRSS" typically stands for "Joint verification random secret sharing" and includes steps 4 and 5 as well. However, throughout this document JVRSS is taken to mean performing at least steps 1 to 3, where steps 4 and 5 are optional steps.

Now that the participants have generated a shared polynomial, they can each verify that the other participants have shared the correct information to all participants, and that all participants have the same shared polynomial. This is done in the following way.

4. Each participant i broadcasts to all participants the obfuscated coefficients $$a_{ik} \cdot G,$$

for $k=0, \ldots, t$.

5. Each participant i checks that each participant j has correctly calculated the polynomial point $f_j(i)$ by calculating $f_j(i) \cdot G$ and verifying that $$f_j(i) \cdot G \stackrel{?}{=} \sum_{k=0}^{t} i^k (a_{jk} \cdot G) \forall j = 1, \ldots, N.$$

If all participants find that this equation holds for each polynomial, then the group can collectively be sure that they have all created the same shared polynomial.

Reconstructing a Shared Secret

Assume a participant wants to reconstruct a shared secret a which is the zeroth order of a shared polynomial. Given (t+1) points on this polynomial of the form $$(1,a1), \ldots, ((t+1),a_{t+1}),$$

then to find the shared secret a, one calculates $$\text{interpolate}(a_1, \ldots, a_{t+1}) = \left( \sum_{l=1}^{t+1} a_l \prod_{\substack{1 \leq j \leq (t+1), \\ j \neq l}} (-j)(l-j)^{-1} \right) = a,$$

which is derived from a general formula known as "Lagrange Interpolation".

Public Key Calculation

Given the N zeroth-order private polynomial coefficient public keys $a_{i0} \cdot G$ for $i=1, \ldots, N$ shared in step 4 of JVRSS, each participant calculates the shared public key P using $$P = a \cdot G = \sum_{j=1}^{N} a_{j0} \cdot G,$$

corresponding to the shared secret a.

Addition of Shared Secrets

To calculate the addition of two shared secrets that are shared amongst a group of N participants, where each secret polynomial has order t, without any entity knowing the individual secrets, the following steps are taken:

1. Generate the first shared secret a, where participant i's share is given by $a_i$=JVRSS(i) for $i=1, \ldots, N$ with a threshold of (t+1).
2. Generate the second shared secret b, where participant i's share is given by $b_i$=JVRSS(i), with a threshold of (t+1).
3. Each participant i calculates their own additive share $$v_i = a_i + b_i \mod n.$$

4. All participants broadcast their additive share $v_i$ to all other participants.
5. Each participant interpolates over at least (t+1) of the shares $v_i$ to calculate $$v = \text{interpolate}(v_1, \ldots, v_{t+1}) = a+b.$$

This method for the addition of shared secrets is denoted by ADDSS(i) for participant i, which results in each participant i knowing $v=(a+b)$.

Product of Shared Secrets

To calculate the product of two shared secrets that are both shared amongst a group of N participants, where each secret polynomial has order t, the group takes the following steps:

1. Generate the first shared secret a, where participant i's share is given by $a_i$=JVRSS(i) for $i=1, \ldots, N$. The shared secret polynomial has order t, meaning (t+1) participants are required to recreate it.
2. Generate the second shared secret b, where participant i's share is given by $b_i$=JVRSS(i), and the shared secret polynomial again has order t.
3. Each participant calculates their own multiplicative share $\mu_i$ using $$\mu_i = a_i b_i.$$

4. All participants broadcast their multiplicative share $\mu_i$ to all other participants.

5. Each participant interpolates over at least (2t+1) of the shares $\mu_i$ at 0 to calculate $$\mu = \text{interpolate}(\mu_1, \ldots, \mu_{2t+1}) = ab.$$

This method for calculating the product of two shared secrets is denoted herein by $\mu = ab = \text{PROSS}(i)$ for participant i.

Inverse of a Shared Secret

In order to calculate the inverse of a shared secret a, the following steps are taken:
1. All participants calculate the product of shared secrets PROSS(i), the result of which is $\mu = ab \mod n$.
2. Each participant calculates the modular inverse of $\mu$ which results in $$\mu^{-1} = (ab)^{-1} \mod n.$$

3. Each participant i calculates their own inverse secret share by calculating $$a_i^{-1} = \mu^{-1} b_i.$$

This method for calculating the inverse of shared secrets is denoted by $a_i^{-1} = \text{INVSS}(i)$ for participant i.

Shared Private Key Generation and Verification

To calculate a shared private key a between $N \geq 2t+1$ participants, t+1 of which are required to create a signature, the participants execute JVRSS with a threshold of t+1 and public key calculation as described above. The result is that every participant $i=1, \ldots, N$ has a private key share $a_i$ and the corresponding shared public key $P = (a \cdot G)$.

Ephemeral Key Shares Generation

To generate ephemeral key shares and the corresponding r, as is required in a signature, a group of size N with a shared private key a of threshold (t+1) execute the following steps:
1. Generate the inverse share of a shared secret $k_i^{-1} = \text{INVSS}(i)$, where (t+1) shares are required to recreate it.
2. Each participant calculates $$(x, y) = \sum_{i=1}^{N} (k_{i0} \cdot G),$$

using the obfuscated coefficients shared in the verification of $k_i$, then they calculate $$r = x \mod n.$$

3. Each participant i stores $(r, k_i^{-1})$.

Generating Shared Keys

Embodiments of the present invention enable two parties to generate a shared cryptographic key, where at least one of those parties comprises a group of participants (e.g. users or machines). FIG. 1 illustrates an example system 100 for generating a shared key. As shown, the system 100 comprises a first party which comprises a first coordinator 101 and a first group of participants 102. Only three participants 102 are shown in FIG. 1, but it will be appreciated that in general the first group may comprise any number of participants. Furthermore, in FIG. 1 the first coordinator 101 is shown as being distinct from the participants 102, but in some embodiments the first coordinator 101 may also be one of the participants 102, e.g. the first participant 102a. Also shown in FIG. 1 is a second party comprising a second coordinator 103.

Figure 2:
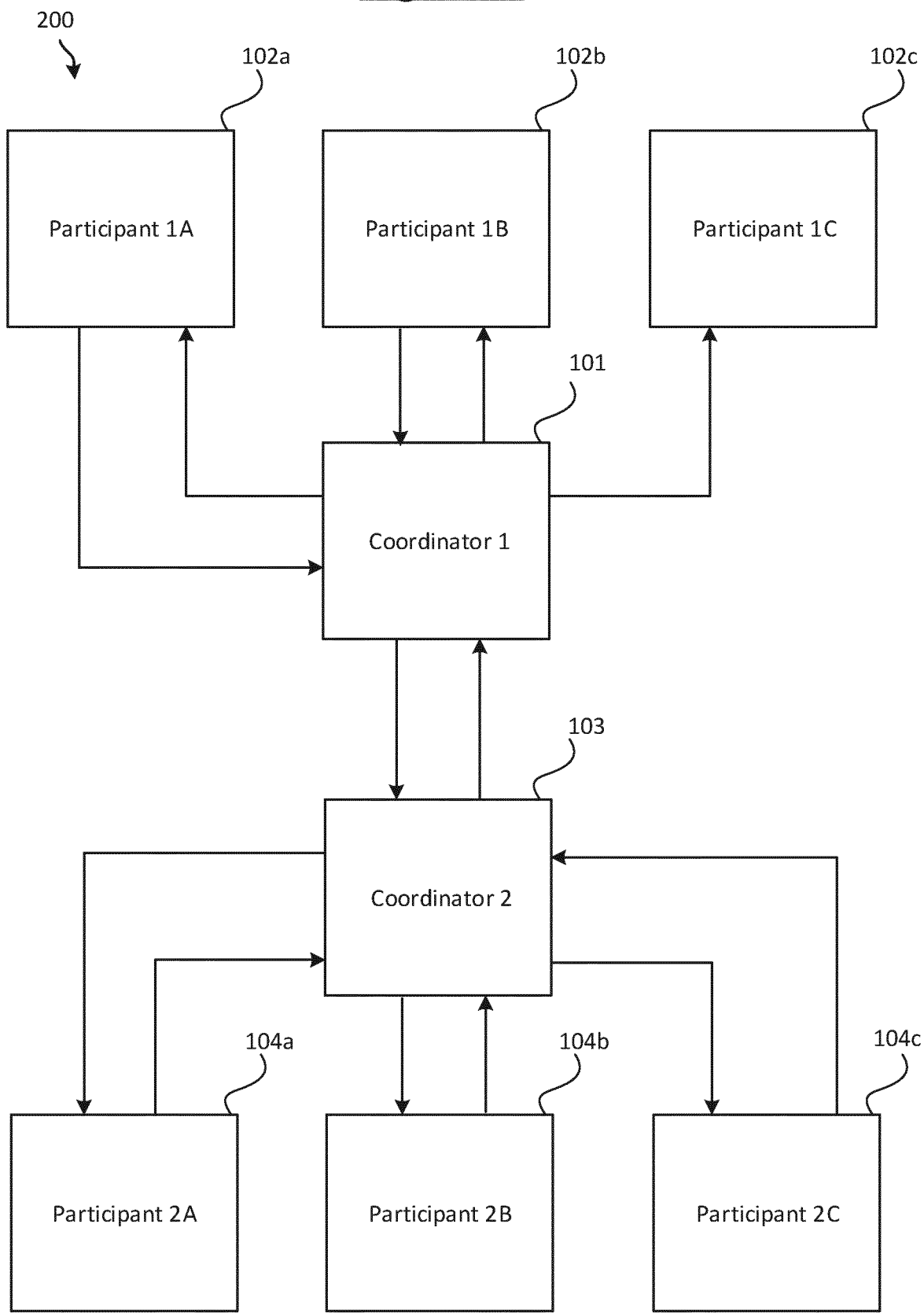

As shown in FIG. 2, in some embodiments the second party may also comprise a second group of participants 104.

As is the case for the first group of participants, the second group may in general comprise any number of participants 104.

The first coordinator 101, the second coordinator 103, each of the first group of participants, and each of the second group of participants, operate respective computing equipment. Each of the respective computing equipment comprises respective processing apparatus comprising one or more processors, e.g. one or more central processing units (CPUs), accelerator processors (GPUs), application specific processors and/or field programmable gate arrays (FPGAs). The respective computing equipment may also comprise memory, i.e. computer-readable storage in the form of a non-transitory computer-readable medium or media. The memory may comprise one or more memory units employing one or more memory media, e.g. a magnetic medium such as a hard disk; an electronic medium such as a solid-state drive (SSD), flash memory or EEPROM; and/or an optical medium such as an optical disk drive. The respective computing equipment may comprise at least one user terminal, e.g. a desktop or laptop computer, a tablet, a smartphone, or a wearable device such as a smartwatch. Alternatively or additionally, the respective computing equipment may comprise one or more other networked resources, such as cloud computing resources accessed via the user terminal (the cloud computing resources comprising resources of one or more physical server devices implemented at one or more sites). It will be appreciated that any act described as being performed by a party (e.g. coordinator, participant, etc.) may be performed by the respective computing apparatus operated by that party.

Referring back to FIG. 1, the first coordinator 101 (on behalf of the first group of participants) and the second coordinator 103 wish to generate a shared key. This key will be referred to as a shared Diffie-Hellman (DH) key. This label is used merely for convenience and does not place any limitations on the key other than those imposed by the present description.

In the embodiment of FIG. 1, the second coordinator 103 has a public key corresponding to a private key. "Having" a key means storing that key in memory, or being otherwise able to access and retrieve that key. For example, a key may be written down on paper and then input to a device, e.g. via a user interface. In this embodiment, the private key is a complete (i.e. full, whole, etc.) key. A private key may be said to be a complete key if it directly maps, by way of a generator point, to the corresponding public key.

Each participant 102 of the first group has a share (a "private key share") of a private key. This private key will be referred to as the first private key. The private key associated with the second coordinator 103 will be referred to as the second private key. The first private key and the second private key are different keys (e.g. different integers). In some examples, the first coordinator 101 also has a share of the first private key.

The first private key is a threshold private key. This means that at least a threshold number of the first private key shares are required to reconstruct the first private key. Techniques for generating shares of a threshold private key per se will be familiar to the skilled person. One such technique is known as joint verifiable random secret sharing (JVRSS) and is described above. The first group of participants may each use JVRSS to generate their respective shares of the first private key. Another technique is known as Shamir's secret sharing scheme (SSSS). The first group of participants may each use SSSS to obtain their respective shares of the first private key. Note that SSSS requires a coordinator 101, whereas JVRSS does not. Another technique for generating and distributing private key shares is described in WO2017145010A1.

The first private key has a corresponding public key—a first public key. The first public key may be known to the first coordinator 101 and/or one, some or all of the participants 102.

In embodiments, the first coordinator 101 may obtain a public key (a second public key) corresponding to the second private key. For example, the second coordinator 103 may transmit the second public key to the first coordinator 101. Alternatively, the second public key may be obtained from a publicly accessible source such as a website or a blockchain. Alternatively, the first coordinator 101 may already have access to the second public key, e.g. it may be stored in memory.

The first coordinator 101 may send the second public key to some or all of the participants 102 of the first group. The first coordinator 101 may send the second the second public key to each participant 102 separately, or the first coordinator 101 may broadcast the second public key to the first group. It is also not excluded that some or all of the participants 102 may already have access to the second public key, in which case the first coordinator 101 does not have to send the second public key to those participants 102, although the first coordinator 101 may still choose to do so.

The first coordinator 101 obtains at least a threshold number of respective shares of a shared DH key. For example, the first coordinator 101 may send (e.g. broadcast) a request to the participants 102 for a respective share of the shared DH key. As shown in FIG. 1, in some embodiments not all of the participants are required to generate a share of the shared DH key. This will depend on the threshold of the first private key. Each share of the shared DH key is generated based on (i.e. is a function of) a different respective share of the first private key, i.e. each share of the shared DH key is generated by a different participant 102. Each share of the shared DH key is also generated based on the second public key. Recall from above that each participant either already has the second public key or it may be obtained from the first coordinator 101. In some examples, one of the shares is generated by the first coordinator 101.

Each share of the shared DH key may be generated by performing elliptic curve multiplication of the respective first private key share and the second public key. It is not excluded that the shares of the shared DH key are calculated using alternative mathematical operations.

Each of the participants 102 that generates a share of the shared DH key may transmit their share directly to the first coordinator 101, or via one or more other participants. The shares may be transmitted over a secure communication channel.

Having obtained the required number of different shares of the shared DH key, the first coordinator 101 generates the complete shared DH key. The shared DH key is a function of the obtained shares. For example, the shared DH key may be obtained by performed elliptic curve interpolation of the shares of the shared DH key.

The second coordinator 103 is configured to generate the same shared DH key. In some embodiments, the second coordinator 103 generates the shared DH key based on the first public key and the second private key. In this case the second coordinator has access to the full second private key, i.e. not just a share of the second private key. The second coordinator 101 may already have access to the first public key, e.g. it may be obtained from a publicly accessible source such as the blockchain. Alternatively, the first coordinator 101 may send the first public key to the second coordinator 103. In some examples, each participant 102 may have a share of the first public key corresponding to their respective share of the first private key. The first coordinator 101 may require a threshold number of shares of the first public key in order to generate the first public key, before sending it to the second coordinator 103.

As mentioned above, the first private key shares may be generated using JVRSS or an equivalent scheme. In these embodiments, each participant of the first group has a respective zeroth order coefficient of a private polynomial (e.g. see step 1 of the JVRSS method described above). Now instead of calculating their respective share of the shared DH key based on their respective share of the first private key, each participant generates their respective share based on their respective zeroth order coefficient. Each share of the shared DH key is also based on the second public key. In these examples, a respective shared of the shared DH key must be obtained from each participant 102.

Referring to FIG. 2, the second private key may be a threshold private key and each participant 104 of the second group may have a share of the second private key. In these embodiments, the second coordinator 103 may perform equivalent operations to the first coordinator in order to generate the shared DH key based on respective shares of the shared DH key generated by the participants 104 of the second group. E.g. the participants of the second group may generated shares of the shared DH key based on the first public key and either their respective share of the second private key, or their respective zeroth order coefficient of their respective private polynomial.

Regardless of the method chosen by the second coordinator 103, both the first coordinator 101 and the second coordinator 103 will have the same shared DH key. The shared DH key may then be used to encrypt messages, i.e. any type of data. For example, the first coordinator 101 may encrypt a message and send the encrypted message to the second coordinator 103, or vice versa. The message may comprise personal and/or confidential information, e.g. financial data, medical data, prescription data, etc. The message may comprise a contract or other type of document.

The shared DH key may be used as a symmetric encryption key, in which case it can be used to both encrypt and decrypt messages. Any suitable symmetric encryption scheme may be used, e.g. data encryption standard (DES), triple DES, Blowfish, advanced encryption standard (AES), Rivest Cipher 4 (RC4), RC5, or RC6. For example, the first coordinator 101 may receive an encrypted message from the second coordinator 103 which has been encrypted with the shared DH key. The first coordinator 101 may then use the shared DH key to decrypt the message (i.e. decrypt the ciphertext to obtain the plaintext message). In some examples, the shared DH key may be used as an asymmetric key, e.g. a public key.

In this case, a message may be encrypted with the shared DH key such that it can only be decrypted with the corresponding private key. Neither the first coordinator 101 nor the second coordinator 103 has enough information to compute the corresponding private key.

In order to do so, the first coordinator 101 and the second coordinator 103 may perform threshold computation (e.g. interpolation over the private key shares) to compute the private key corresponding to the shared DH key.

In some examples, having obtained the private key corresponding to the shared DH key, the first coordinator 101 may generate a digital signature based on a message to be signed and the private key. The second coordinator 103 may also generate a digital signature using the private key. In some examples, a blockchain transaction may be created (e.g. by the first coordinator 101 or the second coordinator) that comprises an output locked to the shared DH key. The first coordinator 101 or the second coordinator 102 may unlock the output by generating a blockchain transaction that comprises an input referencing the output of the earlier blockchain transaction, and comprising a digital signature generated using the private key and a message comprising at least part of the transaction.

The first coordinator 101 may generate one or more additional cryptographic keys based on the shared DH key. For example, the shared DH key may be input to a hash function (e.g. SHA256, SHA512, etc.). The hash digest may be used as an additional cryptographic key. The shared DH key may be hashed multiple times to generate multiple additional cryptographic keys. Additional cryptographic keys may be generated in alternative ways. For instance, the shared DH key may be combined with a different key (e.g. a different public key) using point addition. The second coordinator 103 can perform the same operation(s) as the first coordinator to generate the same additional cryptographic keys. This allows many keys to be generated from the same shared DH key, e.g. to prevent key re-use.

Figure 3:
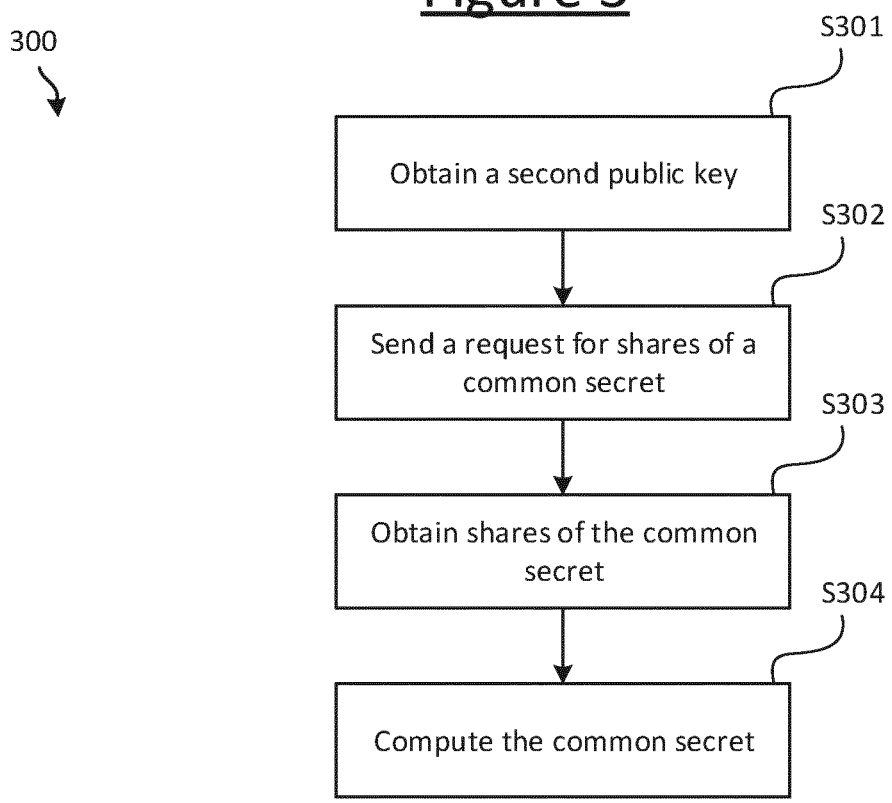
FIG. 3 shows an example method for generating shared keys according to some embodiments of the present invention, and FIG. 4 schematically illustrates an example blockchain transaction protocol.

FIG. 3 shows an example method 300 for generating a shared DH key. It will be appreciated that some of the steps are optional. At step S301, the first coordinator 101 obtains a second public key, e.g. from the second coordinator 103. At step S302, the first coordinator sends a request to the participants 102 of the first group, requesting shares of the shared DH key (the common secret). At step S303, the first coordinator 101 obtains at least a threshold number of shared DH key shares. At step S304, the first coordinator 101 computes the shared DH key. The shared DH key may then be used for, among other things, encrypting messages.

The following provides further examples of the described embodiments. In the following examples, Bob is equivalent to the first coordinator 101 and Alice is equivalent to the second coordinator 103.

In order to calculate a shared DH key where at least one of the keys is a shared secret between a group of N participants, the following steps may be taken. Assume that Alice wants to create a secret channel with Bob's threshold group. That is, Bob's group has N participants, each with a share $b_i$ of the private key b and assume that (t+1) of them would need to cooperate to calculate the private key. The corresponding public keys of Alice and Bob's group are assumed to be public.

In order to calculate a shared DH key requiring (t+1) of the group to cooperate, the follow steps may be taken.
1. Alice 103 receives the public key of Bob's group b·G and calculates a(b·G) using point multiplication.
2. A coordinator Bob 101 of Bob's group requests at least (t+1) shares of a shared DH key using a·G.
3. At least (t+1) participants in Bob's group calculate $b_i$(a·G) using Alice's public key.
4. The (t+1) participants send their share to Bob 101 using a secure communication channel.
5. Bob 101 calculates the shared DH key using $$b(a \cdot G) = \text{ECinterpolate}(b_1(a \cdot G), \ldots, b_{t+1}(a \cdot G)),$$

where ECinterpolate is the same as the equation for normal interpolation but using point addition instead of the usual addition over the natural numbers.

Now both Alice 103 and Bob's group have a shared key ab·G that they can use to encrypt messages. The shared key may be used for symmetric or asymmetric encryption. If used for the latter, the corresponding private key ab may be calculated using threshold computation.

If Alice's private key is a shared secret as well, her group would also execute the same steps as in steps 2-5.

There is also another way to calculate the shared DH key avoiding elliptic curve interpolation, but each participant must contribute. The participants may take the following steps.
1. Alice 103 receives the public key of Bob's group b·G and calculates a(b·G).
2. A coordinator Bob 101 of Bob's group requests all N participants to calculate a share of a DH key using a·G.
3. The N participants in Bob's group calculate bio(a. G) using Alice's public key, where $b_{i0}$ is the zeroth order of participant i's private polynomial.
4. The N participants send their share to Bob 101 using a secure communication channel or broadcasting to the scheme participants only.
5. Bob 101 calculates the shared DH key using $$b(a \cdot G) = \sum_{i=1}^{N} b_{i0}(a \cdot G).$$

In this equation, the summation is point addition.

If Alice 101 is part of a threshold scheme as well, her group would also execute steps 2-5.

In step 4 of both schemes, the participants should preferably send their shares via a secure communication channel with Bob 101. If they send their share on a public network and they are obtained, then anyone may be able to calculate the shared DH key. This contradicts that the shared DH key should be a shared secret between Alice 103 and Bob's group.

The two methods may be combined. For example, Bob's group may calculate the shared DH key using the first method whilst Alice's group calculates the shared DH key using the second method, or vice versa. The first method is slightly slower than the second method, but it allows for the shared DH key to be recovered if lost. Conversely, the second method is faster than the first method, but the shared DH key is not recoverable if a participant of Bob's group loses their respective share of their shared private key. Of course the shared DH key may still be calculated by Alice. The second method is desirable if the use case benefits from contribution by all participants.

Example Use Cases

Embodiments of the present invention may be used for a variety of use cases, and in particular ones where it is desirable to remove the single point of failure associated with a private key. For instance, if a full private key is lost then a shared key generated based on the private key is not recoverable. Furthermore, if a shared key is generated based on a full private key and that private key is stolen or otherwise compromised, then any message encrypted with the shared key may be decryptable (depending on how the shared key is generated). Embodiments of the present invention are also particularly advantageous where increased security of a message is important such that the message is not easily decryptable. For instance, it is important to keep sensitive data, such as a patient's medical history, safe and secure.

The shared DH key may be used to encrypt and share a patient's medical data. For example, a patient may choose to share his/her medical data with a third party service provider or data company. E.g. the patient may sell his/her data to a data analytics company. In this example the patient (equivalent to the second coordinator 103) may have a private-public key pair. The service provider, the patient and the patient's doctor (equivalent to the first group of participants 102, with the service provider also being the first coordinator 101) may each have shares of a shared private key. At least two of the three parties in this example are required to construct the shared DH key. The patient and the service provider use embodiments of the present invention to construct the shared DH key. The service provider will only be able to construct the same shared DH key if the patient and/or their doctor provide a share of the shared DH key to the service provider. The patient may then encrypt his/her medical data with the shared DH key and send the encrypted data to the service provider. The service provider may then use the shared DH key to decrypt and gain access to the patient's medical data.

As another example, a shared DH key may be used to share media content, e.g. as part of a streaming service. For example, a content provider (second coordinator 103) may want to stream a movie to a user. The content provider has a private-public key pair. The content provider and the user have shares of a shared private key. In this example the user is equivalent to the first coordinator 101. The content provider generates a shared DH key using its private key and the public key corresponding to the shared private key. The content provider encrypts part or all of the movie and sends the encrypted data to the user. The user may generate a share of the shared DH key using the user's share of the private key and the content provider's public key. In this example all owners of a private key share are required to participate to generate the shared DH key. Therefore the user will only be able to generate the full shared DH key if the content provider also provides a share of the shared DH key. The content provider may choose to provide a share of the shared DH key in return for payment from the user.

In general, the present invention can be used to encrypt any message. As a particular example use case, the message may be part or all of a blockchain transaction. Additionally or alternatively, the encrypted message may be included in a blockchain transaction.

Threshold signature schemes have been briefly discussed above. With such a scheme, embodiments of the present invention may be used to store an encrypted share of a shared secret, i.e. a share of a private key used to generate a share of the threshold signature. Then, if the share of the shared secret is lost, the share can be recovered with a threshold number of participants agreeing to decrypt the share for the participant who has lost their share.

Figure 4:
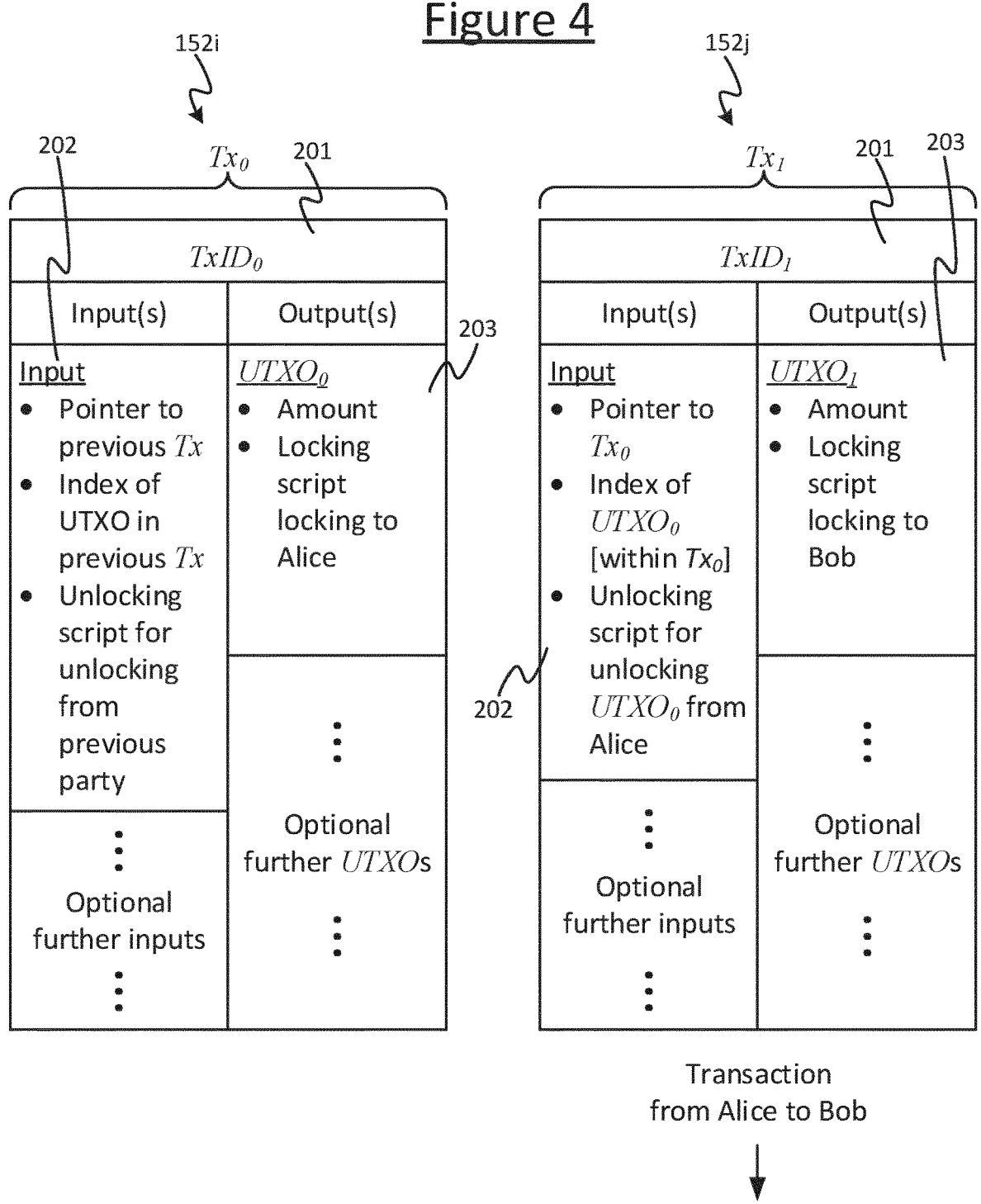

FIG. 4 illustrates an example transaction protocol for use as part of a blockchain protocol. Example blockchain protocols are well documented in the literature, but a description of an example protocol transaction is provided here for completeness. This is an example of a UTXO-based protocol. A transaction 152 (abbreviated "Tx") is the fundamental data structure of the blockchain (each block of the blockchain comprising one or more transactions 152). The following will be described by reference to an output-based or "UTXO" based protocol. However, this not limiting to all possible embodiments.

In a UTXO-based model, each transaction ("Tx") 152 comprises a data structure comprising one or more inputs 202, and one or more outputs 203. Each output 203 may comprise an unspent transaction output (UTXO), which can be used as the source for the input 202 of another new transaction (if the UTXO has not already been redeemed). The UTXO includes a value specifying an amount of a digital token, e.g. representing an amount of a digital asset. This represents a set number of tokens on the (distributed) ledger. The UTXO may also contain the transaction ID of the transaction from which it came, amongst other information. The transaction data structure may also comprise a header 201, which may comprise an indicator of the size of the input field(s) 202 and output field(s) 203. The header 201 may also include an ID of the transaction. In embodiments the transaction ID is the hash of the transaction data (excluding the transaction ID itself) and stored in the header 201 of the raw transaction 152 submitted to the miners.

Say a first user, e.g. Alice, wishes to create a transaction 152$j$ transferring an amount of the digital token in question to a second user, e.g. Bob. In FIG. 4 Alice's new transaction 152$j$ is labelled "$Tx_1$". It takes an amount of the digital token that is locked to Alice in the output 203 of a preceding transaction 152$i$ in the sequence, and transfers at least some of this to Bob. The preceding transaction 152$i$ is labelled "$Tx_0$" in FIG. 4. $Tx_0$ and $Tx_1$ are just arbitrary labels. They do not necessarily mean that $Tx_0$ is the first transaction in the blockchain, nor that $Tx_1$ is the immediate next transaction in the pool. $Tx_1$ could point back to any preceding (i.e. antecedent) transaction that still has an unspent output 203 locked to Alice.

The preceding transaction $Tx_0$ may already have been validated and included in the blockchain at the time when Alice creates her new transaction $Tx_1$, or at least by the time she sends it to the network 106. It may already have been included in one of the blocks at that time, or it may be still waiting in the pool 154 in which case it will soon be included in a new block. Alternatively $Tx_0$ and $Tx_1$ could be created and sent to the blockchain network together, or $Tx_0$ could even be sent after $Tx_1$ if the node protocol allows for buffering "orphan" transactions. The terms "preceding" and "subsequent" as used herein in the context of the sequence of transactions refer to the order of the transactions in the sequence as defined by the transaction pointers specified in the transactions (which transaction points back to which other transaction, and so forth). They could equally be replaced with "predecessor" and "successor", or "antecedent" and "descendant", "parent" and "child", or such like. It does not necessarily imply an order in which they are created, sent to the network, or arrive at any given node. Nevertheless, a subsequent transaction (the descendent transaction or "child") which points to a preceding transaction (the antecedent transaction or "parent") will not be validated until and unless the parent transaction is validated. A child that arrives at a node before its parent is considered an orphan. It may be discarded or buffered for a certain time to wait for the parent, depending on the node protocol and/or miner behaviour.

One of the one or more outputs 203 of the preceding transaction $Tx_0$ comprises a particular UTXO, labelled here $UTXO_0$. Each UTXO comprises a value specifying an amount of the digital token represented by the UTXO, and a locking script which defines a condition which must be met by an unlocking script in the input 202 of a subsequent transaction in order for the subsequent transaction to be validated, and therefore for the UTXO to be successfully redeemed. Typically the locking script locks the amount to a particular party (the beneficiary of the transaction in which it is included). I.e. the locking script defines an unlocking condition, typically comprising a condition that the unlocking script in the input of the subsequent transaction comprises the cryptographic signature of the party to whom the preceding transaction is locked.

The locking script (aka scriptPubKey) is a piece of code written in the domain specific language recognized by the node protocol. A particular example of such a language is called "Script" (capital S). The locking script specifies what information is required to spend a transaction output 203, for example the requirement of Alice's signature. Unlocking scripts appear in the outputs of transactions. The unlocking script (aka scriptSig) is a piece of code written the domain specific language that provides the information required to satisfy the locking script criteria. For example, it may contain Bob's signature. Unlocking scripts appear in the input 202 of transactions.

So in the example illustrated, $UTXO_0$ in the output 203 of $Tx_0$ comprises a locking script [Checksig PA] which requires a signature Sig PA of Alice in order for $UTXO_0$ to be redeemed (strictly, in order for a subsequent transaction attempting to redeem $UTXO_0$ to be valid). [Checksig PA] contains the public key PA from a public-private key pair of Alice. The input 202 of $Tx_1$ comprises a pointer pointing back to $Tx_1$ (e.g. by means of its transaction ID, $TxID_0$, which in embodiments is the hash of the whole transaction $Tx_0$). The input 202 of $Tx_1$ comprises an index identifying $UTXO_0$ within $Tx_0$, to identify it amongst any other possible outputs of $Tx_0$. The input 202 of $Tx_1$ further comprises an unlocking script <Sig $P_A$> which comprises a cryptographic signature of Alice, created by Alice applying her private key from the key pair to a predefined portion of data (sometimes called the "message" in cryptography). What data (or "message") needs to be signed by Alice to provide a valid signature may be defined by the locking script, or by the node protocol, or by a combination of these.

When the new transaction $Tx_1$ arrives at a node, the node applies the node protocol. This comprises running the locking script and unlocking script together to check whether the unlocking script meets the condition defined in the locking script (where this condition may comprise one or more criteria). In embodiments this involves concatenating the two scripts:

<Sig $P_A$><$P_A$>||[Checksig $P_A$]

where "||" represents a concatenation and "< . . . >" means place the data on the stack, and "[ . . . ]" is a function comprised by the unlocking script (in this example a stack-based language). Equivalently the scripts may be run one after the other, with a common stack, rather than concatenating the scripts. Either way, when run together, the scripts use the public key $P_A$ of Alice, as included in the locking script in the output of $Tx_0$, to authenticate that the locking script in the input of $Tx_1$ contains the signature of Alice signing the expected portion of data. The expected portion of data itself (the "message") also needs to be included in $Tx_0$ in order to perform this authentication. In embodiments the signed data comprises the whole of $Tx_0$ (so a separate element does to need to be included specifying the signed portion of data in the clear, as it is already inherently present).

The details of authentication by public-private cryptography will be familiar to a person skilled in the art. Basically, if Alice has signed a message by encrypting it with her private key, then given Alice's public key and the message in the clear (the unencrypted message), another entity such as a node of the blockchain network is able to authenticate that the encrypted version of the message must have been signed by Alice. Signing typically comprises hashing the message, signing the hash, and tagging this onto the clear version of the message as a signature, thus enabling any holder of the public key to authenticate the signature. Note therefore that any reference herein to signing a particular piece of data or part of a transaction, or such like, can in embodiments mean signing a hash of that piece of data or part of the transaction.

If the unlocking script in $Tx_1$ meets the one or more conditions specified in the locking script of $Tx_0$ (so in the example shown, if Alice's signature is provided in $Tx_1$ and authenticated), then the blockchain node deems $Tx_1$ valid. If it is a mining node, this means it will add it to the pool of transactions awaiting proof-of-work. If it is a forwarding node, it will forward the transaction $Tx_1$ to one or more other nodes in the blockchain network, so that it will be propagated throughout the network. Once $Tx_1$ has been validated and included in the blockchain, this defines $UTXO_0$ from $Tx_0$ as spent. Note that $Tx_1$ can only be valid if it spends an unspent transaction output 203. If it attempts to spend an output that has already been spent by another transaction, then $Tx_1$ will be invalid even if all the other conditions are met. Hence the node 104 also needs to check whether the referenced UTXO in the preceding transaction $Tx_0$ is already spent (has already formed a valid input to another valid transaction). This is one reason why it is important for the blockchain 150 to impose a defined order on the transactions. In practice a given node 104 may maintain a separate database marking which UTXOs 203 in which transactions have been spent, but ultimately what defines whether a UTXO has been spent is whether it has already formed a valid input to another valid transaction in the blockchain.

If the total amount specified in all the outputs 203 of a given transaction is greater than the total amount pointed to by all its inputs 202, this is another basis for invalidity in most transaction models. Therefore such transactions will not be propagated nor mined into blocks.

Note that the script code is often represented schematically (i.e. not the exact language). For example, one may write [Checksig $P_A$] to mean [Checksig $P_A$]=OP_DUP OP_HASH160 <H($P_A$)> OP_EQUALVERIFY OP_CHECKSIG. "OP_. . . " refers to a particular opcode of the Script language. OP_CHECKSIG (also called "Checksig") is a Script opcode that takes two inputs (signature and public key) and verifies the signature's validity using the Elliptic Curve Digital Signature Algorithm (ECDSA). At runtime, any occurrences of signature ('sig') are removed from the script but additional requirements, such as a hash puzzle, remain in the transaction verified by the 'sig' input. As another example, OP_RETURN is an opcode of the Script language for creating an unspendable output of a transaction that can store metadata within the transaction, and thereby record the metadata immutably in the blockchain. E.g. the metadata could comprise a document which it is desired to store in the blockchain.

The signature $P_A$ is a digital signature. In embodiments this is based on the ECDSA using the elliptic curve secp256k1. A digital signature signs a particular piece of data. In embodiments, for a given transaction the signature will sign part of the transaction input, and all or part of the transaction output. The particular parts of the outputs it signs depends on the SIGHASH flag. The SIGHASH flag is a 4-byte code included at the end of a signature to select which outputs are signed (and thus fixed at the time of signing).

The locking script is sometimes called "scriptPubKey" referring to the fact that it comprises the public key of the party to whom the respective transaction is locked. The unlocking script is sometimes called "scriptSig" referring to the fact that it supplies the corresponding signature. However, more generally it is not essential in all applications of a blockchain that the condition for a UTXO to be redeemed comprises authenticating a signature. More generally the scripting language could be used to define any one or more conditions. Hence the more general terms "locking script" and "unlocking script" may be preferred.

According to some embodiments of the present invention, a transaction may be a pay-to-public-key-hash (P2PKH) output which is locked to a hash of the shared DH key. In order to be unlocked, an input of a later transaction that references the P2PKH output needs to include the (unhashed) shared DH key and a signature generated based on the private key corresponding to the shared DH key. Represented in script, the "locking script" and "unlocking script" may take the following forms:

Locking script=OP_DUP OP_HASH160<Public Key-Hash> OP_EQUAL OP_CHECKSIG

Unlocking script=<Signature><Public Key>

It will be appreciated that the above embodiments have been described by way of example only. More generally there may be provided a method, apparatus or program in accordance with any one or more of the following Statements.

Statement 1. A computer-implemented method of generating a shared cryptographic key based on at least one shared secret, wherein each participant belonging to a first group has a respective share of a first secret, the first secret having a first threshold and a corresponding first public key, wherein a second coordinator has a second public key corresponding to a second secret, and wherein the method is performed by a first coordinator of the first group and comprises:

obtaining, from at least the first threshold number of participants of the first group, respective shares of the shared cryptographic key, where each respective share of the shared cryptographic key is based on i) a respective share of the first secret or a respective zeroth order coefficient of a respective private polynomial used to calculate the respective share of the first secret, and ii) the second public key; and generating the shared cryptographic key based on the obtained respective shares of the cryptographic key, wherein the second coordinator is configured to generate the same shared cryptographic key.

Statement 2. The method of statement 1, wherein the coordinator is one of said participants belonging to the first group.

Statement 3. The method of statement 1 or statement 2, comprising:

obtaining the second public key; and transmitting the second public key to each participant of the first group.

Statement 4. The method of any preceding statement, comprising transmitting the first public key to second coordinator.

Statement 5. The method of statement 4, comprising:

obtaining, from at least the first threshold number of participants of the first group, respective shares of the first public key, wherein each respective share of the first public key is based on the respective share of the first secret and a public key generator.

Statement 6. The method of statement 3 or any statement dependent thereon, wherein said obtaining of the second public key comprises receiving the second public key from the second coordinator.

Statement 7. The method of any preceding statement, wherein said respective share of the shared DH key is generated based on the respective share of the first secret, and wherein said generating of the shared cryptographic key comprises performing elliptic curve interpolation over the obtained respective shares of the shared cryptographic key.

Statement 8. The method of any of statements 1 to 6, wherein said respective share of the shared cryptographic key is generated based on the respective zeroth order coefficient of a respective private polynomial used to calculate the respective share of the first secret, wherein said obtaining of the respective shares of the shared cryptographic key comprises obtaining a respective share of the shared cryptographic key from each of the first group of participants, and wherein said generating of the shared cryptographic key comprises performing point addition of the obtained respective shares of the shared cryptographic key.

Statement 9. The method of any preceding statement, comprising encrypting a first message with the shared cryptographic key.

Statement 10. The method of statement 9, comprising transmitting the encrypted first message to the second coordinator and/or to a different party.

Statement 11. The method of statement 9 or statement 10, comprising:

generating a blockchain transaction, wherein the blockchain transaction comprises the encrypted message; and making the blockchain transaction available to one or more nodes of a blockchain network.

Statement 12. The method of any preceding statement, wherein the shared cryptographic key is a symmetric key, wherein a second message has been encrypted with the shared cryptographic key, and wherein the method comprises decrypting the second message using the shared cryptographic key.

Statement 13. The method of any preceding statement, comprising:

obtaining a private key corresponding to the shared cryptographic key; and generating a digital signature using the corresponding private key, and/or using the corresponding private key to decrypt a third message that has been encrypted with the shared cryptographic key.

Statement 14. The method of statement 13, wherein a first blockchain transaction comprises an output locked to the shared cryptographic key, and wherein the method comprises generating a second blockchain transaction having an input that references the output of the first blockchain transaction and comprises the digital signature for unlocking said output.

Statement 15. The method of any preceding statements, comprising generating one or more additional cryptographic keys based on the shared cryptographic key.

Statement 16. The method of statement 15, wherein said generating of the one or more additional cryptographic keys comprises applying a hash function to the shared cryptographic key.

Statement 17. The method of any preceding statement, wherein the second secret is a shared secret, wherein a second group comprises a plurality of participants, and wherein each participant of the second group has a respective share of a second secret, the second secret having a second threshold.

Statement 18. The method of statement 17, wherein each participant of the second group has a respective zeroth order coefficient of a respective private polynomial used to calculate the respective share of the second secret.

Statement 19. Computer equipment comprising:
memory comprising one or more memory units; and
processing apparatus comprising one or more processing units, wherein the memory stores code arranged to run on the processing apparatus, the code being configured so as when on the processing apparatus to perform the method of any of statements 1 to 18.

Statement 20. A computer program embodied on computer-readable storage and configured so as, when run on computer equipment, to perform the method of any of statements 1 to 18.

According to another aspect disclosed herein, there may be provided a method comprising the actions of the first participant and the key generator.

According to another aspect disclosed herein, there may be provided a system comprising the computer equipment of the first participant and the key generator.

Other variants or use cases of the disclosed techniques may become apparent to the person skilled in the art once given the disclosure herein. The scope of the disclosure is not limited by the described embodiments but only by the accompanying claims.

The invention claimed is:

1. A computer-implemented method of generating a shared cryptographic key based on at least one shared secret, wherein each participant belonging to a first group has a respective share of a first secret, the first secret having a first threshold number and a corresponding first public key, wherein a second coordinator has a second public key corresponding to a second secret, and wherein the method is performed by a first coordinator of the first group and comprises:
obtaining, from at least the first threshold number of participants of the first group, respective shares of the shared cryptographic key, where each respective share of the shared cryptographic key is based on i) a respective zeroth order coefficient of a respective private polynomial used to calculate the respective share of the first secret, and ii) the second public key; and
generating the shared cryptographic key based on the obtained respective shares of the cryptographic key, wherein the second coordinator is configured to generate the same shared cryptographic key.

2. The method of claim 1, wherein the coordinator is one of said participants belonging to the first group.

3. The method of claim 1, comprising:
obtaining the second public key; and
transmitting the second public key to each participant of the first group.

4. The method of claim 1, comprising transmitting the first public key to second coordinator.

5. The method of claim 4, comprising:
obtaining, from at least the first threshold number of participants of the first group, respective shares of the first public key, wherein each respective share of the first public key is based on the respective share of the first secret and a public key generator.

6. The method of claim 3, wherein said obtaining of the second public key comprises receiving the second public key from the second coordinator.

7. The method of claim 1, wherein said respective share of the shared cryptographic key is generated based on the respective zeroth order coefficient of a respective private polynomial used to calculate the respective share of the first secret, wherein said obtaining of the respective shares of the shared cryptographic key comprises obtaining a respective share of the shared cryptographic key from each of the first group of participants, and wherein said generating of the shared cryptographic key comprises performing point addition of the obtained respective shares of the shared cryptographic key.

8. The method of claim 1, comprising encrypting a first message with the shared cryptographic key.

9. The method of claim 8, comprising transmitting the encrypted first message to the second coordinator and/or to a different party.

10. The method of claim 8, comprising:
generating a blockchain transaction, wherein the blockchain transaction comprises the encrypted message; and
making the blockchain transaction available to one or more nodes of a blockchain network.

11. The method of claim 1, wherein the shared cryptographic key is a symmetric key, wherein a second message has been encrypted with the shared cryptographic key, and wherein the method comprises decrypting the second message using the shared cryptographic key.

12. The method of claim 1, comprising:
obtaining a private key corresponding to the shared cryptographic key; and
generating a digital signature using the corresponding private key, and/or using the corresponding private key to decrypt a third message that has been encrypted with the shared cryptographic key.

13. The method of claim 12, wherein a first blockchain transaction comprises an output locked to the shared cryptographic key, and wherein the method comprises generating a second blockchain transaction having an input that references the output of the first blockchain transaction and comprises the digital signature for unlocking said output.

14. The method of claim 1, comprising generating one or more additional cryptographic keys based on the shared cryptographic key.

15. The method of claim 14, wherein said generating of the one or more additional cryptographic keys comprises applying a hash function to the shared cryptographic key.

16. The method of claim 1, wherein the second secret is a shared secret, wherein a second group comprises a plurality of participants, and wherein each participant of the second group has a respective share of a second secret, the second secret having a second threshold number.

17. The method of claim 16, wherein each participant of the second group has a respective zeroth order coefficient of a respective private polynomial used to calculate the respective share of the second secret.

18. Computer equipment, comprising:
memory comprising one or more memory units; and
processing apparatus comprising one or more processing units, wherein the memory stores code arranged to run on the processing apparatus, the code being configured so as when run on the processing apparatus, the processing apparatus performs a method of generating a shared cryptographic key based on at least one shared secret, wherein each participant belonging to a first group has a respective share of a first secret, the first secret having a first threshold number and a corresponding first public key, wherein a second coordinator has a second public key corresponding to a second secret, and wherein the method is performed by a first coordinator of the first group and comprises:
obtaining, from at least the first threshold number of participants of the first group, respective shares of the shared cryptographic key, where each respective share of the shared cryptographic key is based on i) a respective zeroth order coefficient of a respective private polynomial used to calculate the respective share of the first secret, and ii) the second public key; and generating the shared cryptographic key based on the obtained respective shares of the cryptographic key, wherein the second coordinator is configured to generate the same shared cryptographic key.

19. A computer program embodied on non-transitory computer-readable storage media and configured so as, when run on computer equipment, the computer equipment performs a method of generating a shared cryptographic key based on at least one shared secret, wherein each participant belonging to a first group has a respective share of a first secret, the first secret having a first threshold number and a corresponding first public key, wherein a second coordinator has a second public key corresponding to a second secret, and wherein the method is performed by a first coordinator of the first group and comprises:

obtaining, from at least the first threshold number of participants of the first group, respective shares of the shared cryptographic key, where each respective share of the shared cryptographic key is based on i) a respective zeroth order coefficient of a respective private polynomial used to calculate the respective share of the first secret, and ii) the second public key; and generating the shared cryptographic key based on the obtained respective shares of the cryptographic key, wherein the second coordinator is configured to generate the same shared cryptographic key.

\* \* \* \* \*